Nov. 27, 1956     M. C. HUTTO, JR     2,771,687
BORE GAGE
Filed July 8, 1952     2 Sheets-Sheet 1
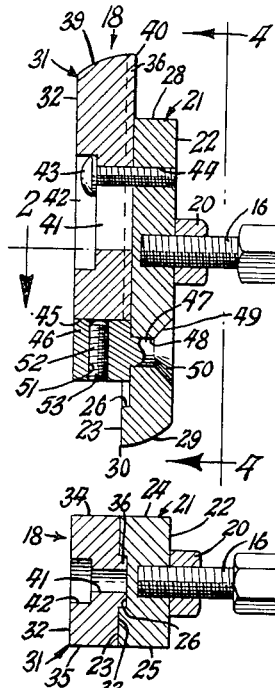
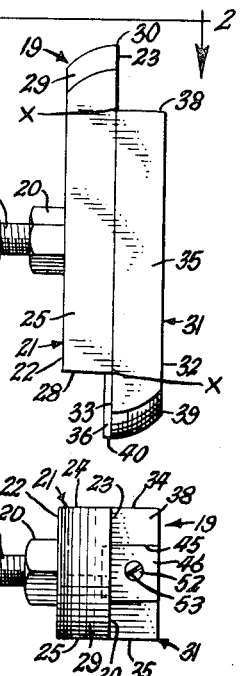
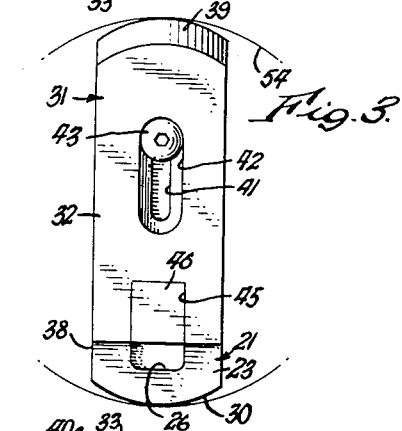
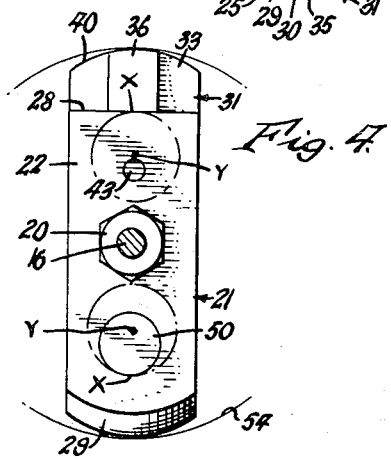
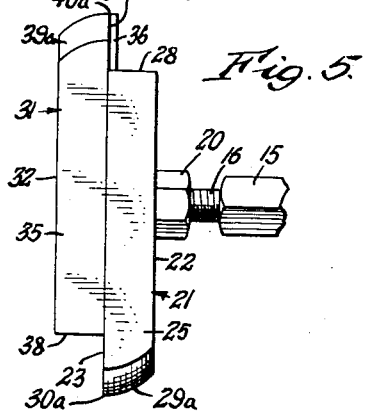
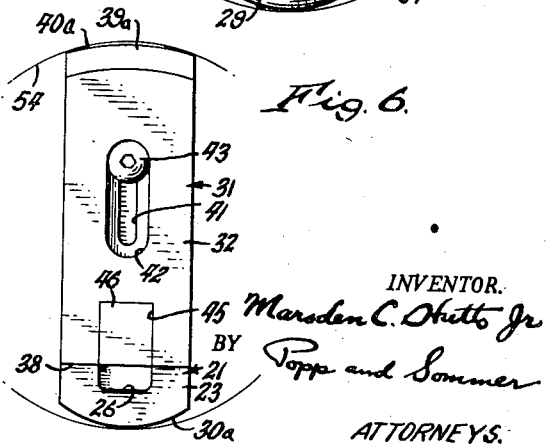
INVENTOR.
Marsden C. Hutto Jr
BY Popp and Sommer
ATTORNEYS.

Nov. 27, 1956 — M. C. HUTTO, JR — 2,771,687
BORE GAGE
Filed July 8, 1952 — 2 Sheets-Sheet 2
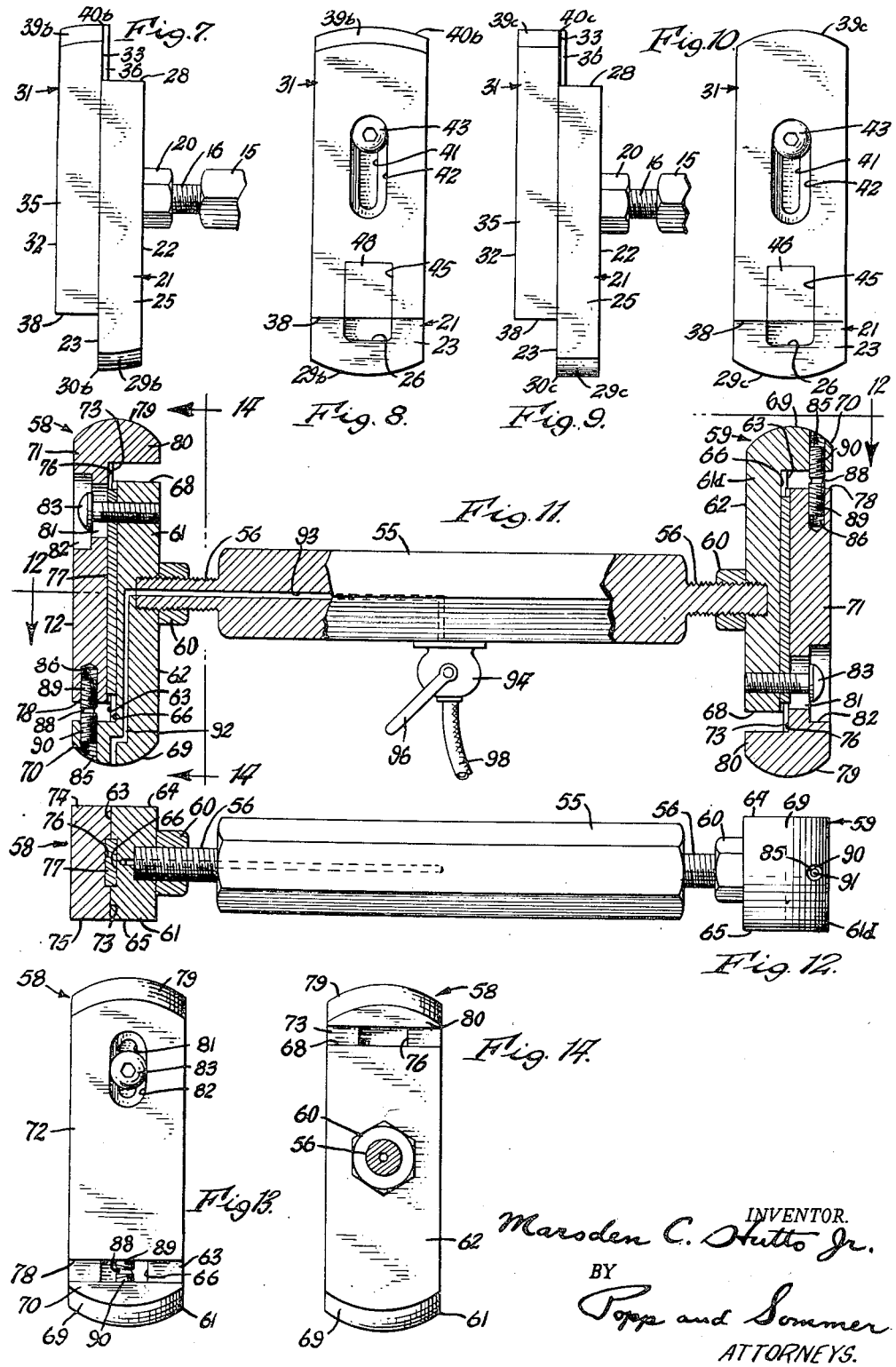

United States Patent Office 2,771,687
Patented Nov. 27, 1956

2,771,687

BORE GAGE

Marsden C. Hutto, Jr., Muskegon, Mich.

Application July 8, 1952, Serial No. 297,698

6 Claims. (Cl. 33—178)

This invention relates to a bore gage and is shown as embodied both in a gage for determining, by the use of go and no go ends, when a bore is within the required tolerance limits and also in a compressed air type of bore gage in which the back pressure of compressed air escaping past one gaging surface is employed to indicate the degree of closeness of fit of the gage.

Heretofore plug gages have been employed for such gaging, but are subject to disadvantage in that they are very difficult to fit because they must be exactly alined with the bore, and hence a part with a bore of the required size will frequently be made larger than the specified maximum size merely because the go gage was not properly alined with the bore and hence apparently would not enter the bore because of being oversized. Further a plug gage will not detect and determine an out-of-round condition of the bore since it only checks the magnitude of the inscribed circle of the bore.

Bore gages having disk-like go and no go end heads, cut away or flattened on opposite radial sides and having their ends spherically ground with a part of the spherical faces cut away from one side of an equatorial line perpendicular to the major axis of each head have also been used. Such gages have the advantage of being readily insertable into the bore by tipping them so that the gaging surfaces are not brought into contact with the bore until the major axis of the gage is straightened with reference to the axis of the bore, and hence this type of gage eliminates a principal disadvantage of plug gages which require very careful alinement with the bore in order to enter the bore even when smaller than the bore. Also this type of gage can be used to determine an out-of-round condition of the bore since it can be turned around its major axis and its gage faces applied to different diametrically opposite parts of the bore. Further this type of gage quickly and accurately informs the user as to whether or not the bore, or any part thereof, exceeds the size of the gage. As the gage, through its handle which is concentric with its major axis, is swung so that its axis would cross the axis of the bore, the gaging surfaces either hang up or bind in the bore or they do not. If they do, the bore is smaller than the gage and if they do not the bore is larger than the gage and by the use of go and no go gages the bore can be readily brought within the specified tolerance. This latter type of gage can also be used to check progressively the bore along its length, including the bottom of the bore.

This latter type of gage has the principal disadvantage, however, of not being adjustable so that a very large stock of such gages are required to be maintained in order to check bores of the many diameters and tolerances produced in the usual machine shop or manufacturing plant. Further as this type of gage becomes worn it can only be dressed down to a smaller size gage.

It is a principal object of the present invention to provide a bore gage having the advantages but not the disadvantages of this latter type gage. More specifically with the present invention the gaging surfaces are radially adjustable so as to permit the gage to be used to check bores of widely varying diameters. By this a machine shop or manufacturing plant is required to maintain only a small stock of the present gages since each can be adjusted to check a wide range of bore sizes.

Another object of the invention is to provide a gage having the above advantageous features in which it is unnecessary that the surfaces toward the bore be spherical and in which these surfaces can be cylindrical, conical, or ring-shaped.

Another object is to provide a gage having the above advantageous features but not the disadvantageous features in which the go and no go heads at the ends of a single handle can be adjusted to any desired differential in size thereby to adjust it to the specified tolerance of the bores to be checked.

Another object is to provide a gage having the above advantages but not the disadvantages which can readily be adjusted to the desired size by the use of a simple micrometer and screw driver.

Another object is to provide such an adjustable gage which includes a fine adjustment in the form of a screw which can be turned by the use of a screw driver to obtain a very fine adjustment of the gaging blocks or elements wtih reference to each other.

Another object of the invention is to provide such an adjustable bore gage which can be used as a compressed air type of bore gage in which compressed air is permitted to escape between a gaging surface of the gage and the bore being checked and in which the back pressure of the compressed air is measured to determine the rate of escape of the air and hence the degree of clearance of the gage surface from the bore.

Another object of the invention is to provide such an adjustable bore gage which is extremely simple and inexpensive in construction and also in which there is no danger of the gage losing its adjustment even under severe conditions of use.

Other objects and advantages of the invention will be apparent from the following description and drawings in which:

Fig. 1 is a side elevation of a bore gage embodying the present invention, with parts broken away, and having similar go and no go heads at its opposite ends.

Fig. 2 is a horizontal section taken generally on line 2—2, Fig. 1.

Fig. 3 is an outside end elevational view thereof viewed from the left hand end of Fig. 1.

Fig. 4 is a vertical section taken on line 4—4, Fig. 1.

Fig. 5 is a fragmentary side elevational view of one end of a gage and in which the head is adapted for three point gaging of the bore.

Fig. 6 is an outside end elevational view of the head shown in Fig. 5 and showing the manner in which three point gaging is obtained.

Figs. 7 and 8 are views similar to Figs. 5 and 6, respectively, and showing a further modification of the invention in which the end surfaces of the gage blocks are of spherical form.

Figs. 9 and 10 are views similar to Figs. 5 and 6, respectively, and showing the end surfaces of the gage blocks of cylindrical form.

Fig. 11 is a view similar to Fig. 1 and showing a modification of the invention in which one end of the gage is used as a compressed air type of bore gage.

Fig. 12 is a section taken generally on line 12—12, Fig. 11.

Fig. 13 is an outside end elevational view, viewed from the left hand end of Fig. 11.

Fig. 14 is a section taken on line 14—14, Fig. 11.

In the form of the invention shown in Figs. 1–4, the bore gage includes a straight metal handle 15 which is shown as being hexagonal in cross section and provided with coaxial threaded ends 16. On one threaded end 16 is screwed a go gage 18 and on the other threaded end 16 is screwed a no go gage 19. Both the go and no go gages are secured on the threaded ends 16 by lock nuts 20. The go and no go gages 18 and 19 are preferably identical in construction, the only difference being that the no go gage 19 is adjusted to have a slightly greater effective size than the go gage 18, the differential representing the permitted tolerance of the bore. Accordingly the same reference numerals are employed for both the go gage 18 and the no go gage 19 and the same description of the construction, use and manner of adjustment applies.

Each bore gage 18, 19 comprises a gage member or block 21 which is of elongated form and is shown as being of rectangular form in cross section with a flat back face 22, an opposite face 23, and side faces 24 and 25, all of which faces are preferably parallel. The gage member or block 21 is provided in its face 23 with a longitudinal groove 26. This is shown as a rectangular groove starting at the square end 28 of the gage member or block and terminating short of the opposite rounded end 29 thereof. The face 23 forms with the rounded end 29 a rounding, preferably circular, gage edge 30.

A companion gage member or block 31 is fitted against the gage member or block 21 in mating relation with the face 23 thereof. This gage member or block 31 is also of elongated form and is shown as being of rectangular form in cross section with a flat face 32 forming the axial end face of the tool, an opposite face 33 mating with the face 23, and side faces 34 and 35 which are shown as coplanar with the faces 24, 25, respectively, and all of which faces 32, 33, 34 and 35 are preferably parallel. The gage member or block 31 is provided on its face 33 with a longitudinal slide projection or key 36, preferably integral with the gage block or body 31 and closely fitting the groove 26 so as to permit the gage blocks 21 and 31 to slide longitudinally relative to each other with their faces 23 and 33 in full mating engagement. One end 38 of the gage member or block 31 is shown as being square and the other end 39 is shown as being rounded. The face 33 forms with the rounded end face 39 a rounding, preferably circular, gage edge 40. The rounding ends 29 and 39 and gage edges 30, 40 are disposed on the ends of the gage blocks which project outwardly from the assembly of gage blocks.

The gage blocks 21 and 31 are adjustable lengthwise of each other to adjust the spacing of their rounding ends 29 and 39 and are releasably fixed in the adjusted position. For this purpose the gage block 31 is provided with a longitudinal slot 41 and is provided with a marginal recess 42 surrounding this slot. The slot 41 is of a width to receive the shank of a screw 43 and the marginal recess 42 is of a size to receive the head of this screw, so that this head is recessed into the gage block 31 below the level of the face 32 thereof. The shank of the screw 43 screws into a threaded bore 44 extending transversely through the gage block 21. It will be seen that on loosening the screw 43 the gage blocks 21 and 31 can be slid longitudinally with reference to each other and that the selected adjustment can be maintained by tightening the screw 43.

It is desirable to have a micro adjustment for the position of the gage blocks 21 and 31 longitudinally with reference to each other. For this purpose the square end 38 of the gage block 31 is provided with a rectangular recess 45. In this recess is fitted a square block 46. This square block has an integral stem 47 which extends through a transverse bore 48 through the gage block 21. The end of this bore 48 opposite the gage block 21 preferably flares to provide an enlarged conical recess 49 and the extremity of the stem 47 is peened over or riveted down to form a rivet head 50. The square block 46 is provided with a threaded through bore 51 which is arranged parallel with the slideway 26 and key or slide 36. In this threaded bore is arranged an adjusting screw 52 having a screw driver slot 53 at its exposed end. The other end of this adjusting screw 52 bears against the inner extremity of the rectangular end slot 45 of the gage block 31. It will be seen that after loosening the screw 43 the adjusting screw 52 can be turned to project the gage block 31 longitudinally with reference to the gage block 21, to the exact degree required, by the application of a micrometer to the rounding gage edges 30 and 40 and that hence this adjusting screw 52 provides a micro adjustment.

Each end head 18, 19 has a major axis extending lengthwise of the handle 15 and which extends centrally through the end heads 18, 19 midway between the curved surfaces 29, 39 and perpendicular to the mating faces 22, 23, 32, 33 thereof. This major axis is brought toward concentricity with the bore being checked in the use of the tool.

The bore to be gaged is indicated at 54. If the radius or diameter of this bore is greater than the maximum or less than the minimum for which the gage is set, the no-go gage will not jam or hang up or the go gage will jam or hang up, in either of which events the part is not acceptable. If the minimum radius of this bore 54 is equal to or greater than the setting of the go gage and if the maximum radius or diameter of this bore 54 is equal to or less than the setting of the no-go gage, the part will be favorably checked by the gage.

The rounding end faces 29 and 39 can be of a variety of shapes as more particularly outlined in the following description of the various modifications of the present invention. In the torus form of the invention shown in Figs. 1–4 these faces are non-spherical and are segments of the outer faces of a doughnut shaped ring which is circular and the sides of which are circular in cross section. The curved surfaces 29, 39 are shown as generated concentric with a circular axis X which lies in the plane of the mating faces 23, 33 of the two gage blocks. This circular axis X (Fig. 4) is concentric with a straight axis Y, the curved surfaces 29 and 39 also being generated concentric with this axis Y. The axis Y of each gage block is parallel with the major axis of each end head and it will be apparent from an inspection of Figs. 3 and 4 that the radius Y—30 or Y—40 is no greater and in fact much less than the minimum radius of the bore 54 to be gaged. The circular axis X lies in a plane perpendicular to the axis Y and in the plane of the mating faces 23, 33 of each pair of gage blocks. As a consequence the mating faces 23 and 33 form, respectively, with the curved surfaces 29, 39 the curved gaging edges 30 and 40. These curved gaging edges are concentric with the axis Y, and are also in the plane of the mating faces 23 and 33 and these gaging edges 30 and 40 are further out than any other part of the curved surfaces 29, 39. It will be seen that in addition to the curved edges 30, 40 being the most remote part of the curved surfaces 29, 39, the curved surfaces 29, 39 are tangential to those perpendicular to the mating faces 23, 33 which intersect the curved gaging edges 30, 40. These gaging edges 30, 40 provide the effective gaging points of the bore gage and while theoretically only point contact obtains, except in that one adjustment where the curved gaging edges coincide with the bore being gaged, in actual practice there is substantial area contact between the bore and the curved surfaces 29, 39 immediately adjacent to the curved gaging edges 30, 40 in view of the tangential relation of these curved surfaces to those perpendiculars of the mating faces 23, 33 which intersect the curved gaging edges 30, 40.

In using the form of the invention shown in Figs. 1–4, the curved gaging edges 30, 40 of the go gage 18 are set to the minimum tolerance of the bore 54 to be gaged and the no go gage 19 is set to the maximum tolerance of this bore 54 to be gaged. This is effected by loosening the screws 43 to permit longitudinal relative sliding movement of the gage blocks 21, 31; unscrewing the adjusting screws 52 and pushing the gage blocks 21, 31 together; arranging a micrometer (not shown) in the path of the opposite curved gage edges 30, 40 of each gage; screwing each adjusting screw until these curved gage edges contact the micrometer; and retightening the set screws 43.

The go gage 18 is then inserted into the bore 54 with the major axis of the tool inclined with reference to the axis of the bore. In this position the gage blocks 21, 31 enter the bore 54 freely because the curved gaging edges 30, 40 are effectively closer together than the opposite sides of the bore 54. Upon now swinging the handle 15 toward alining the major axis of the tool with the axis of the bore 54 the curved gaging edges 30, 40 will either bind in the bore 54 or they will not. If they do the diameter of the bore is less than the spacing of the curved gaging edges 30, 40 in the plane of the mating faces 23, 33 and hence the bore 54 is less than the specified minimum diameter and must be ground to a larger diameter. If the gaging edges 30, 40 do not bind, the diameter of the bore 54 exceeds the minimum specified diameter and the no go gage 19 is used to ascertain that the bore 54 does not exceed the maximum specified diameter.

The no go gage is used in the same manner as the go gage. Upon bringing the major axis of the tool toward alinement with the axis of the bore 54 the curved gaging edges 30, 40 of the no go gage either bind or they do not. If they bind the bore 54 is less than the specified maximum diameter and the bore is within the specified limits. If the curved gaging edges 30, 40 do not bind, the bore exceeds the maximum specified diameter and the part must be rejected for the intended use.

It is not necessary that the degree of curvature of the gaging edges 30, 40 be the same and from an inspection of Figs. 5 and 6, which show a modification, it will be seen that the radius of the corresponding curved gaging edge 40a is much larger than the radius of the companion curved gaging edge 30a. This differential is for the purpose of three point gaging in the bore 54. Thus in Fig. 6 it will be seen that the curved gaging edge 40a contacts the bore 54 at two places, i. e., at its opposite ends whereas the curved gaging edge 30a contacts the bore 54 at its center as with the form of the invention shown in Figs. 1–4. As a result the bore gage has a three point contact with the bore. Since in other respects the form of the invention shown in Figs. 5 and 6 is identical with the form shown in Figs. 1–4, the same reference numerals have been used and the description is not repeated.

It is not essential that the curved surfaces 29, 39 of the doughnut shaped ring or torus form as above described. These surfaces can be spherical, conical, cylindrical or of any other rounding form. In Figs. 7 and 8 is illustrated a modification in which the curved surfaces 29b, 39b, which correspond to the curved surfaces 29, 39 of the form of the invention shown in Figs. 1–4, are of spherical form, the curved gaging edges 30b and 40b being of the same form as the curved gaging edges 30, 40 of the form of the invention shown in Figs. 1–4. It is desirable that these spherical surfaces 29b, 39b be ground so that they could never form surfaces of a common sphere in any position of adjustment of the gage blocks 21, 31. Thus these spherical surfaces 29b, 39b can be jointly ground with the gage blocks 21, 31 set closer together than their minimum adjustment in the tool. By so grinding these spherical surfaces the tool can never be adjusted to bring these spherical surfaces to conform to a common sphere and the gaging will always be from the centers of the curved gaging edges 30b, 40b. Since in other respects the form of the invention shown in Figs. 7 and 8 is identical to the form of the invention shown in Figs. 1–4, the same reference numerals have been employed and the description of the construction, adjustment and use is not repeated.

In Figs. 9 and 10 is illustrated a form of the invention in which the curved surfaces 29c and 39c, which correspond to the surfaces 29 and 39 in the form of the invention shown in Figs. 1–4, are cylindrical instead of torus or ring shaped. These cylindrical surfaces 29c and 39c form curved edges 30c and 40c similar to the curved gaging edges 30 and 40, respectively, of the form of the invention shown in Figs. 1–4. In this form of the invention the curved edges 30c and 40c are not essentially gaging edges as with the corresponding curved gaging edges in the forms of the invention shown in Figs. 1–8 since the form of the invention shown in Figs. 9 and 10 is more in the nature of an adjustable plug gage except that it does not have the disadvantage of a conventional plug gage in requiring careful alinement of the gage with the bore to be checked but can be inserted in a tipped condition as with the other forms of the invention previously described. Since except for the cylindrical form of the curved faces 29c and 39c, the form of the invention shown in Figs. 9 and 10 is identical with the form of the invention shown in Figs. 1–4, the same reference numerals have been employed and the description of the construction, adjustment and operation is not repeated.

Any of the preceding forms of the invention can be adapted to a compressed air type of bore gage but the modification shown in Figs. 11–14 is particularly directed to such an air type bore gage.

As with the form of the invention shown in Figs. 1–4, the form of bore gage shown in Figs. 11–14 includes a straight metal handle 55 provided with coaxial ends 56. While with an air type bore gage one end would not be a go gage and the other end a no go gage, an air gage 58 is shown as screwed on one end 56 and an ordinary gage 59 is shown as screwed on the other end 56. Both of the bore gages 58 and 59 are secured on the corresponding threaded end 56 by a lock nut 60. The only difference between the end heads 58 and 59 is that one is provided with the duct necessary to make it an air type bore gage.

The compressed air type of bore gage 58 comprises a gage member 61 which is shown as being of elongated form and of rectangular form in cross section with a flat back face 62, an opposite face 63 and side faces 64 and 65 all of which faces are preferably parallel. The gage member or block 61 is provided in its face 63 with a longitudinal groove 66. This is shown as a rectangular groove starting at the square end 68 of the gage member block and terminating short of the opposite rounded end face 69 thereof. Between the end of the groove 66 and the rounding end face 69, the gage block 58 is provided with a lateral extension 70 over which the rounding end face 69 is continued.

A companion gage member or block 71 is fitted against the gage member or block 61 in mating relation with the face 63 thereof. This gage member or block 71 is also of elongated form and is shown as being of rectangular form in cross section with a flat face 72 forming the axial end face of the tool, an opposite face 73 mating with the face 63, and side faces 74 and 75 which are shown as coplanar with the faces 64 and 65, respectively and all of which faces 72, 73, 74 and 75 are preferably parallel. The gage member or block 71 is provided on its face 73 with a longitudinal groove 76 and the grooves 66 and 76 jointly receive a key 77 which permits the gage blocks 61 and 71 to slide longitudinally relative to each other with their faces in full mating engagement. One end 78 of the gage member or block 71 is shown as being square and the other end 79 as being rounded. The rounded end face 79 is shown as continued over a lateral extension 80 of that end of the gage block 71.

The gage blocks 61 and 71 are adjustable lengthwise of each other to adjust the spacing of their rounding ends 69 and 79 and are releasably fixed in the adjusted position. For this purpose the gage block 71 is provided with a longitudinal slot 81 and a marginal recess 82 surrounding this slot. The slot 81 is of a width to receive the shank of a screw 83 and the marginal recess is of a size to receive the head of this screw so that this head is recessed into the gage block 71 below the level of the face 72 thereof. It will be seen that on loosening the screw 83 and gage blocks 61 and 71 can be slid longitudinally with reference to each other and that the selected adjustment can be maintained by tightening the screw 83.

The micro adjustment for the position of the gage blocks 61 and 71 longitudinally with reference to each other is obtained through a threaded bore 85 extending through the lateral extension 70 of the gage block 61 lengthwise of the gage block 61 and alining with a threaded bore 86. The threads in these bores 85, 86 are in reverse relation to each other and jointly receive a screw 88 having reversely threaded ends 89 and 90. The end 90 can be provided with a screw driver recess 91 whereby to turn the screw 88 and effect longitudinal adjustment of the gage blocks 61 and 71 with reference to each other.

The gage block 61 of the head 58 is provided with a bore 92 leading from the center of the rounding face 69 to the axis of the handle 55 and communicating with a bore 93 extending halfway through this handle from the end screwed into the gage block 61. This bore 93 is connected by a manual valve 94 having an operating handle 96 with an air pressure supply line 98. In this air pressure supply line can be arranged any conventional apparatus (not shown) to measure the back pressure of the air and which can be calibrated in units of clearance.

The end head 59 is identical with the end head 58 except that its gage block 61d, which corresponds to the gage block 61, is unprovided with the bore 92. Since in other respects the end head 59 is identical to the end head 58, the same reference numerals have been employed.

As with the tool shown in the preceding figures, the bore gage shown in Figs. 11-14 has a major axis extending lengthwise of the handle 55 and extending centrally through the end heads 58 and 59 midway between the curved faces 69, 79 thereof and perpendicular to the faces 62, 63, 72 and 73 thereof.

The curving surfaces 69, 79 are non-spherical and, as with the form of the invention shown in Figs. 1-4 are segments of the outer faces of a doughnut shaped ring which is circular and the sides of which are circular in cross section. These faces 69, 79 are shaped like the faces 29, 39 of the form of the invention shown in Figs. 1-4 except that the curvature of these faces is continued over the lateral extensions 70, 80 instead of being stopped in the plane of the mating faces 63, 73 as with the form of the invention shown in Figs. 1-4.

In the use of the compressed air type of bore gage shown at the left of Figs. 11 and 12 and in Figs. 13 and 14, the end head 58 is inserted into the bore to be checked and the major axis of the tool is brought into alinement with the axis of the bore, this being done by swinging the handle 55 into alinement with the bore. In this position of the tool the end of the passage or bore 92 is constricted by the internal surface of the bore to be checked. The valve 94 is then opened to admit compressed air from the supply line 98, this compressed air passing through the ducts 93 and 92 and escaping through the restricted space or crevice between the rounding face 69 and the internal surface of the bore. The greater space or clearance, the greater the flow of air and the less the back pressure. By determining the amount of back pressure through a conventional instrument (not shown) the degree of clearance between the face 69 and the bore being checked can be accurately determined.

The gage head shown at the right of Figs. 11 and 12 is used in the same manner as the gages shown in Figs. 1-10. It will be seen that in the use of the gage shown at the right of Fig. 11 the gaging is effected from the central portions of the rounding faces 69, 79 instead of from gaging edges, as with the gaging edges 30, 40 in the form of the invention shown in Figs. 1-4.

From the foregoing it will be seen that the present invention provides a very simple form of bore gage which can be very readily inserted in the bore to be checked and readily manipulated to check the size of the bore with a high degree of accuracy and which can be used to check an out-of-round condition as well as to check almost to the bottom of a blind bore. It will further be seen that all forms of the invention have the advantage of a wide range of adjustability thereby to reduce the necessity for maintaining a large stock of gages in order to check the bores of the various sizes and tolerances normally produced. It will further be seen that the invention is subject to wide modification and is applicable to a compressed air type of gage as well as to a bore gage of the go and no go type.

I claim:

1. An adjustable bore gage having a major axis adapted to be brought toward concentricity with the axis of the bore in checking the diameter of the bore, comprising a first elongated gage block having a rounding bore engaging face at one end generated about an axis extending lengthwise of said major and with the radius of generation not exceeding the minimum radius of the bore to be gaged, and said first gage block having a straight exterior side face extending lengthwise of the first gage block, a second elongated gage block having a rounding bore engaging face at one end generated about an axis extending lengthwise of said major axis and with the radius of generation not exceeding the minimum radius of the bore to be gaged, and said second gage block having a straight exterior side face extending lengthwise of said second gage block and mating with said straight side face of said first gage block to permit sliding of said gage blocks lenthwise relative to each other, a slideway and key connection between said mating faces of said gage blocks and constraining said gage blocks to so slide lengthwise relative to each other, fastening means arranged to secure said gage blocks together in different positions of adjustment lengthwise of each other, and a fine adjustment for said positions of adjustment of said gage blocks, comprising a lateral extension projecting from said mating face of one of said gage blocks into the path of the other gage block, said lateral extension being provided with a threaded bore extending completely therethrough in a direction parallel with the direction of relative movement of said gage blocks, the end of said other gage block adjacent said lateral extension being also provided with a bore in line with and forming a continuation of said first bore, said bores being severally provided with oppositely pitched threads, and an adjusting screw having its opposite ends oppositely threaded and with said opposite ends respectively screwed into said bores.

2. An adjustable bore gage having a major axis adapted to be brought toward concentricity with the axis of the bore in checking the diameter of the bore, comprising a handle extending lengthwise of said axis, a pair of gage members mounted on said handle for movement relative to each other transversely of said major axis and with the outer ends thereof being formed to engage said bore, means securing said gage members against said relative movement in different relative positions, one of said gage blocks being provided with an air passage opening to the surface thereof which engages said bore, and means connecting said passage with a source of compressed air whereby measuring the back pressure of said compressed air indicates the closeness of fit of said gage members in said bore.

3. An adjustable bore gage having a major axis adapted to be brought toward concentricity with the axis of the bore in checking the diameter of the bore, comprising a handle extending lengthwise of said major axis, a first gage member fixed to said handle to project transversely of said axis, a second gage member mounted for movement relative to said first gage member transversely of said axis, the outer ends of said gage members being formed to engage said bore, means securing said gage members against said relative movement in different relative positions, said first gage member being provided with an air passage opening to the surface thereof which engages said bore, said handle being provided with a second air passage communicating with said first air passage, and means connecting said second air passage with a source of compressed air whereby measuring the back pressure of said compressed air indicates the closeness of fit of said gage members in said bore.

4. An adjustable bore gage, comprising a first elongated gage block formed at one end to engage the bore and having a straight exterior side face extending lengthwise of the first gage block, a second elongated gage block having a straight exterior side face extending lengthwise of said second gage block and mating with said straight side face of said first gage block to permit sliding of said gage blocks lengthwise relative to each other, a slideway and key connection between said mating faces of said gage blocks and constraining said gage blocks to so slide lengthwise relative to each other, fastening means arranged to secure said gage blocks together in different positions of adjustment lengthwise of each other, one of said gage blocks being provided with an air passage opening to the surface thereof which engages said bore, and means connecting said passage with a source of compressed air whereby measuring the back pressure of said compressed air indicates the closeness of fit of said gage blocks in said bore.

5. An adjustable bore gage having a major axis adapted to be brought toward concentricity with the axis of the bore in checking the diameter of the bore, comprising a first elongated gage block having a bore engaging rounding face at one end curving about an axis extending lengthwise of said major axis and also having a straight exterior side face extending lengthwise of said first gage block and arranged generally perpendicular to said major axis, a second gage block arranged longitudinally of said first gage block and having a straight exterior side face extending lengthwise of said second gage block and arranged generally perpendicular to said major axis and mating with said straight side face of said first gage block to permit sliding of said gage blocks lengthwise relative to each other and generally perpendicular to said major axis, the end face of said second gage block remote from said rounding face of said first gage block being adapted to engage the bore and curving about an axis extending lengthwise of said major axis, a slideway and key connection between said mating faces of said gage blocks and constraining said gage blocks to so slide lengthwise relative to each other, fastening means arranged to secure said gage blocks together in different positions of adjustment lengthwise of each other, one of said gage blocks being provided with an air passage opening to the surface thereof which engages said bore, and means connecting said passage with a source of compressed air whereby measuring the back pressure of said compressed air indicates the closeness of fit of said gage block in said bore.

6. An adjustable bore gage having a major axis adapted to be brought toward concentricity with the axis of the bore in checking the diameter of the bore, comprising a first elongated gage block having a rounding bore engaging face at one end generated about an axis extending lengthwise of said major axis and with the radius of generation not exceeding the minimum radius of the bore to be gaged, and said first gage block having a straight exterior side face extending lengthwise of the first gage block, a second elongated gage block having a rounding bore engaging face at one end generated about an axis extending lengthwise of said major axis and with the radius of generation not exceeding the minimum radius of the bore to be gaged, and said second gage block having a straight exterior side face extending lengthwise of said second gage block and mating with said straight side face of said first gage block to permit sliding of said gage blocks lengthwise relative to each other, a slideway and key connection between said mating faces of said gage blocks and constraining said gage blocks to so slide lengthwise relative to each other, fastening means arranged to secure said gage blocks together in different positions of adjustment lengthwise of each other, and a fine adjustment for said positions of adjustment of said gage blocks, comprising a lateral extension projecting from said mating face of one of said gage blocks into the path of the other gage block, a single adjusting screw arranged parallel with said slideway and having one end arranged in a bore extending completely through said lateral extension and having its other end arranged in a coaxial bore provided in the corresponding end of said other gage block, and means rotatably anchoring said adjusting screw in each of said bores, at least one of said anchoring means comprising internal threads provided in the corresponding bore and mating with the threads of said screw whereby turning said screw in either direction positively moves said gage blocks relative to each other.

References Cited in the file of this patent

UNITED STATES PATENTS

| | | |
|---|---|---|
| 1,267,946 | Wester | May 28, 1918 |
| 1,365,289 | Snell | Jan. 11, 1921 |
| 1,625,462 | Frauenthal | Apr. 19, 1927 |
| 2,370,219 | Aller | Feb. 27, 1945 |
| 2,472,139 | Aldeborgh et al. | June 7, 1949 |
| 2,616,182 | Brandt | Nov. 4, 1952 |
| 2,636,279 | Tornebohm | Apr. 28, 1953 |

FOREIGN PATENTS

| | | |
|---|---|---|
| 136,427 | Great Britain | Dec. 18, 1919 |
| 49,225 | Sweden | May 18, 1921 |
| 530,117 | Great Britain | Dec. 5, 1940 |
| 109,413 | Sweden | Oct. 28, 1943 |
| 568,301 | Great Britain | Mar. 28, 1945 |
| 584,512 | Great Britain | Jan. 16, 1947 |
| 586,652 | Great Britain | Mar. 26, 1947 |
| 601,908 | Great Britain | May 14, 1948 |
| 616,542 | Great Britain | Jan. 24, 1949 |
| 257,758 | Switzerland | Apr. 16, 1949 |
| 965,491 | France | Sept. 13, 1950 |